R. P. MAIN.
Improvement in Potato-Bug Collectors.
No. 127,079. Patented May 21, 1872.
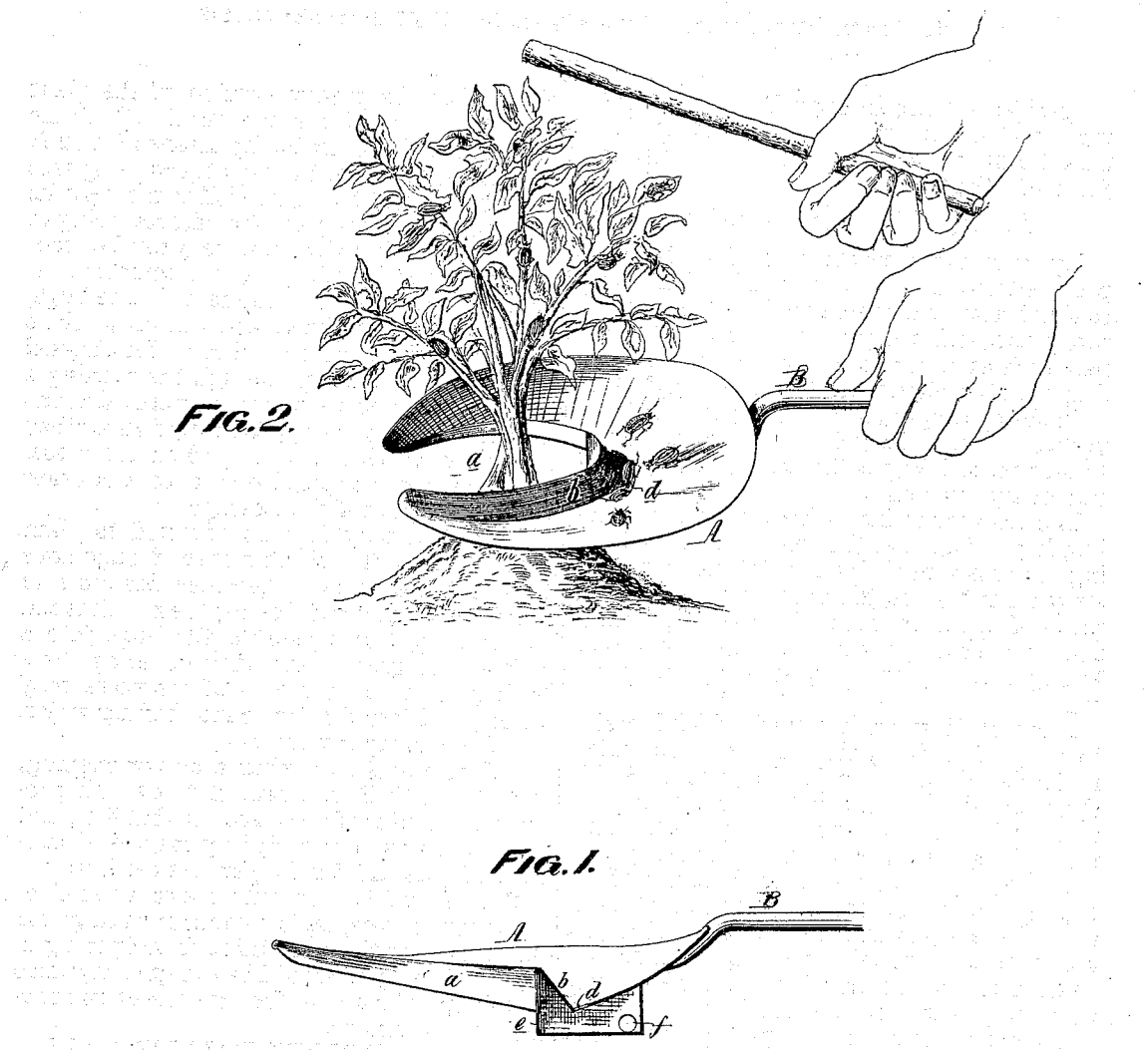

UNITED STATES PATENT OFFICE.

ROBERT PALMER MAIN, OF OREGON, WISCONSIN.

IMPROVEMENT IN POTATO-BUG COLLECTORS.

Specification forming part of Letters Patent No. 127,079, dated May 21, 1872.

Specification describing a Device for Catching Potato-Bugs, invented by ROBERT PALMER MAIN, of Oregon, county of Dane, and State of Wisconsin.

Device for Catching Potato-Bugs.

My invention consists of a slotted vessel provided with a handle, as described hereafter, so that it can be adjusted to the stalk of a potato-plant, and occupy a proper position beneath the same for receiving the bugs as they drop from the plant when the latter is agitated.

In the accompanying drawing, Figure 1 is a vertical section of my device for catching potato-bugs, and Fig. 2 illustrates the application of my invention.

The destructive insect known as the potato-bug is proof against the effects of the poisoning mediums used by agriculturists to destroy other insects, the only effective mode of preventing the ravages of these bugs being that of removing them from the plants and killing them by burning, scalding, or otherwise.

A is a shallow pan or vessel, which I prefer to make of ordinary tinned plate, and which is furnished with a suitable handle, B. A slot or opening, $a$, extends from the outer edge of the vessel to the center or beyond the center of the same, as shown in the drawing.

The vessel may have a flat bottom and an edging at right angles to the bottom continued around the edges and ends of the slot in the said vessel. I prefer, however, to make the vessel comparatively shallow and of a V-shape, as shown, so as to form a continuous channel, $b$, communicating at its deepest part with an opening, $d$, directly above a receptacle, $e$, secured to the under side of the vessel.

The operator with one hand applies the vessel to the potato-plant, as shown in Fig. 2, the main stalk occupying such a position in the slot $a$ that the greater portion of the plant will be directly above the vessel. With his other hand the operator by means of a stick strikes the plant, or he may otherwise agitate it so as to cause the bugs to fall from the stalks and leaves into the pan, the insects being of such a sluggish nature that they can be readily detached from the plant by a comparatively slight disturbance of the same. The bugs, after falling into the vessel, will crawl or be shaken to the lowest portion of the channel $b$, and will then drop through the opening $d$ into the receptacle $e$, which is furnished at one corner with an opening, $f$, through which they may be emptied, and which, when the vessel is in use, can be closed with a cork or other stopper to prevent their escape.

The vessel may thus be adjusted to plant after plant until such a number of bugs have been collected that it becomes desirable to empty the vessel and destroy them. This can be done by simply pouring the bugs into a hole in the ground and then covering them with soil; or the contents of the vessel may be emptied into the fire or into boiling water.

I claim as my invention—

1. The vessel A, having a slot or opening, $a$, and handle B, the said slot extending toward the center of the vessel, so that the plant may be nearly surrounded by the vessel, substantially as and for the purpose set forth.

2. The combination, with the said vessel, of a permanent receptacle, $e$, communicating with the bottom of the same through an opening, $d$.

In testimony whereof I have signed my name to this specification in the presence of two subscribing witnesses.

ROBERT PALMER MAIN.

Witnesses:
 ISAAC HOWE,
 JAS. M. DAVIS.